Figures 1, 2:
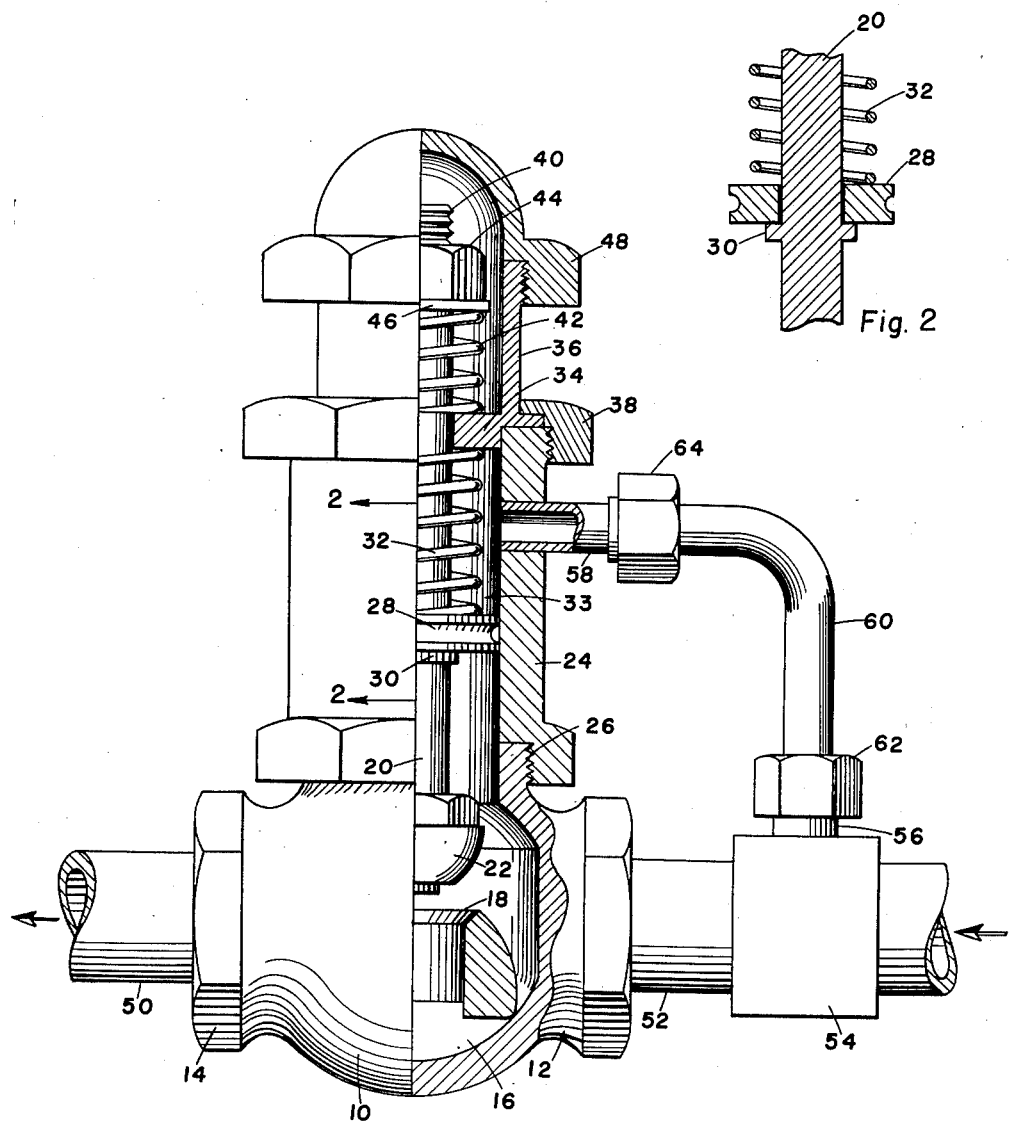

April 6, 1954

F. R. WILSON 2,674,261

ADJUSTABLE AUTOMATIC SHUTOFF VALVE

Filed Aug. 13, 1952

INVENTOR.
FRANK R. WILSON

BY Knox & Knox

AGENTS

UNITED STATES PATENT OFFICE 2,674,261

ADJUSTABLE AUTOMATIC SHUTOFF VALVE

Frank R. Wilson, San Diego, Calif., assignor of fifty per cent to Edward A. Abbott, San Diego, Calif.

Application August 13, 1952, Serial No. 304,160

3 Claims. (Cl. 137—498)

The present invention relates generally to valves and more particularly to an automatic shut-off valve which is adjustable.

The primary object of this invention is to provide a shut-off valve which is adjustable for closure whenever a predetermined sudden differential in pressure occurs in the upstream and downstream conduits connected with the valve as, for example, when there is a rupture of a conduit on the downstream side.

Another basic object of this invention is to provide a shut-off valve wherein the pressure on the valve plunger urging the same into closed position, at the time of rupture of a conduit on the downstream side of the valve, acts upon a greater effective area than the effective area of the valve head portion of the valve plunger so that the valve plunger will positively and instantaneously close.

Another object of this invention is to provide a valve of this character wherein no packing is required and wherein no diaphragms are required.

Another object of the invention is to provide a valve of the character mentioned wherein adjustment can be effected without difficulty, this adjustment being possible without disconnection of the valve or closing thereof and the normal operation of the valve, or of equipment connected therewith, need not be interrupted.

Still another object of this invention is to provide a novel removable cylinder, cylinder extension and plunger arrangement allowing easy access for inspection and repair, easy replacement of worn parts being facilitated.

Yet another object is to provide a valve which is inexpensive and practicable to manufacture.

Finally, it is an object to provide an automatic shut-off valve of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure and wherein similar characters of reference indicate similar or identical elements and portions throughout the specification and throughout the views of the drawing, and in which:

Fig. 1 is a view of my valve operatively connected with an upstream or inlet nipple and a downstream or outlet pipe, the valve being partly in side elevation and partly in vertical cross-section to amplify the disclosure thereof; and Fig. 2 is a fragmentary vertical sectional view of the valve plunger, valve-closing spring and piston portion, this view being on a reduced scale.

Referring now to the drawing in detail, the valve illustrated has a body member 10 with opposed internally threaded ports which may be differentiated as the upstream port or inlet 12 and the downstream port or outlet 14, both of which will normally be constructed with external portions of nut form. The valve has a chamber 16 divided by an integral valve seat 18 into upstream and downstream portions.

A valve plunger 20 having a head 22 is axially slidably mounted in an outwardly extending cylinder 24 threadably connected, as indicated at 26, with the body member 10 and communicating with the upstream side of the chamber 16. The plunger has a piston portion 28 which may comprise a disc of a diameter to engage the inside of the cylinder 24 snugly, this disc being supported coaxially on the plunger by any suitable means such as a shoulder 30 turned on the plunger. The spring 32 tends to close the valve, being mounted coaxially on said plunger in a spring chamber 33 and compressed between said piston portion or disc 28 and a plunger bearing plate 34. This bearing plate 34 comprises an integral part of a cylinder extension 36, which is held on the outer end of said cylinder 24 by a threaded bezel nut 38.

The outer end of the plunger is threaded at 40 and a counterbalancing spring 42 is coaxially mounted on said plunger and compressed between said bearing plate 34 and nut 44 with washer 46 on the threaded end 40 of the plunger. A screw cap 48 closes the outer end of the cylinder extension 36.

It is an important feature of this invention that the disc 28 is of a greater diameter than the valve head 22. When a rupture occurs in a conduit on the downstream side of the valve, as at 50, the pressure in the upstream portion of the chamber 16 falls quickly and the pressure on the opposite side of the disc 28 also tends to fall. To assure positive closing, it is advantageous to have the effective area of the disc 28 greater than the effective area of the valve head 22, since this results in a differential in the opposing forces acting axially on the valve plunger with the greater force tending to close the valve. In practice, this feature has been proven to give instantaneous closing of the valve when rupture occurs on the downstream side. There is no chatter or hesitation in the closing of this valve.

In use, a downstream or outlet pipe 50 and an upstream or inlet nipple 52 will be screwed into the threaded ports 14 and 12 and this nipple 52 has an inlet nipple coupling 54 connected thereon, this coupling having a short radially extending tube 56, while the cylinder 24 is provided with a similar radially extending tube 58. A by-pass tube 60 is connected to and between said short tubes 56 and 58 as indicated at 62 and 64.

The operation of this invention will be clearly comprehended from a consideration of the foregoing description of the mechanical details thereof, taken in connection with the drawing and the above recited objects. It will be obvious that all said objects are amply achieved by this invention.

In recapitulation, however, it should be noted that the adjustment of the counterbalancing spring 42 can be such that the valve is sensitive to relatively small decrease in pressure on the downstream side, if this fall in pressure is rapid. Furthermore, the automatic re-opening of the valve upon restoration of balanced pressure is noteworthy. This equalization of pressure will be achieved, of course, by such means as the opening of a bypass (not shown) ordinarily provided between the conduits on the upstream and downstream sides of the valve. In use, the nut 44 is normally adjusted so that the effective force of the counterbalancing spring 42 is greater than the force of spring 32, and this results in the valve remaining open normally.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

1. An automatic shut-off valve comprising a valve body member having a conduit therethrough, a valve seat in said conduit dividing the conduit into an upstream chamber and a downstream chamber, a cylinder extending outwardly from said body member and communicating with said upstream chamber, a valve plunger axially slidable in said cylinder and having a valve head seating on said valve seat in one position of the plunger to close the valve, said plunger having a piston portion thereon cooperative with said cylinder, a cylinder extension fixed coaxially on the outer end of said cylinder and having a bearing plate for said plunger, the outer portion of said cylinder and said bearing plate comprising a spring chamber, a spring in said spring chamber coaxially arranged on said plunger and compressed between said piston and said bearing plate and biasing said plunger into valve closing position, a cap on said cylinder extension, and a by-pass communicating with said spring chamber and connectible with a conduit on the upstream side of the valve, and adjustable biasing means to overcome the effect of said spring so that a nice adjustment can be obtained for insuring opening of the valve under normal conditions and closure of the valve upon rapid decrease of pressure in a conduit on the downstream side of said valve.

2. An automatic shut-off valve comprising a valve body member having a conduit therethrough, a valve seat in said conduit dividing the conduit into an upstream chamber and a downstream chamber, a cylinder extending outwardly from said body member and communicating with said upstream chamber, a valve plunger axially slidable in said cylinder and having a valve head seating on said valve seat in one position of the plunger to close the valve, said plunger having a piston portion thereon cooperative with said cylinder, a cylinder extension fixed coaxially on the outer end of said cylinder and having a bearing plate for said plunger, the outer portion of said cylinder and said bearing plate comprising a spring chamber, a spring in said spring chamber coaxially arranged on said plunger and compressed between said piston and said bearing plate and biasing said plunger into valve closing position, a cap on said cylinder extension, and a by-pass communicating with said spring chamber and connectible with a conduit on the upstream side of the valve, and adjustable biasing means to overcome the effect of said spring so that a nice adjustment can be obtained for insuring opening of the valve under normal conditions and closure of the valve upon rapid decrease of pressure in a conduit on the downstream side of said valve, said means comprising a counterbalancing spring in said cylinder extension, said plunger having a portion extending into said cylinder extension and terminating in a threaded portion, said counterbalancing spring being coaxially mounted on said extending portion of the plunger and compressed between said bearing plate and a nut on said threaded portion of the plunger.

3. An automatic shut-off valve comprising a valve body member having a conduit therethrough, a valve seat in said conduit dividing the conduit into an upstream chamber and a downstream chamber, a cylinder extending outwardly from said body member and communicating with said upstream chamber, a valve plunger axially slidable in said cylinder and having a valve head seating on said valve seat in one position of the plunger to close the valve, said plunger having a piston portion thereon cooperative with said cylinder, a cylinder extension fixed coaxially on the outer end of said cylinder and having a bearing plate for said plunger, the outer portion of said cylinder and said bearing plate comprising a spring chamber, a spring in said spring chamber coaxially arranged on said plunger and compressed between said piston and said bearing plate and biasing said plunger into valve closing position, a cap on said cylinder extension, and a by-pass communicating with said spring chamber and connectible with a conduit on the upstream side of the valve, and adjustable biasing means to overcome the effect of said spring so that a nice adjustment can be obtained for insuring opening of the valve under normal conditions and closure of the valve upon rapid decrease of pressure in a conduit on the downstream side of said valve, the effective diameter of said piston portion being greater than the effective diameter of said valve head for further assurance of positive and instantaneous action in said closure.

References Cited in the file of this patent

UNITED STATES PATENTS

| Number | Name | Date |
|---|---|---|
| 2,027,762 | Becker | Jan. 14, 1936 |